United States Patent
Nelson

(10) Patent No.: US 6,746,085 B1
(45) Date of Patent: Jun. 8, 2004

(54) BLOW MOLDED, BACKFILLED PROCESS AND PRODUCT

(76) Inventor: Mark S. Nelson, 29800 Agoura Rd., Suite 210, Agoura, CA (US) 91301

( * ) Notice: Subject to any disclaimer, the term of this patent is extended or adjusted under 35 U.S.C. 154(b) by 0 days.

(21) Appl. No.: 10/136,675

(22) Filed: Apr. 29, 2002

(51) Int. Cl.[7] .................................................. A47C 7/00
(52) U.S. Cl. ........................ 297/411.2; 297/411.46; 297/DIG. 1; 264/154; 264/46.6
(58) Field of Search ...................... 297/411.2, 411.23, 297/411.46, 463.1, 463.2, DIG. 1, DIG. 2, 452.57, 452.58, 452.61; 264/154, 155, 156, 523, 46.6; 156/79, 78, 245

(56) References Cited

U.S. PATENT DOCUMENTS

| | | | | |
|---|---|---|---|---|
| 3,161,436 A | * | 12/1964 | Hood | 297/452.27 |
| 3,487,134 A | * | 12/1969 | Burr | 264/46.6 |
| 3,773,875 A | * | 11/1973 | Lammers | 264/46.7 |
| 4,115,170 A | * | 9/1978 | Sanson | 156/79 |
| 4,575,152 A | * | 3/1986 | McLaughlin, Sr. | 297/411.46 |
| 4,738,809 A | * | 4/1988 | Storch | 264/46.6 |
| 4,829,644 A | * | 5/1989 | Kondo et al. | 29/91.1 |
| 4,923,653 A | * | 5/1990 | Matsuura et al. | 264/46.6 |
| 6,419,863 B1 | * | 7/2002 | Khac | 264/46.6 |

* cited by examiner

*Primary Examiner*—Laurie K Cranmer
(74) *Attorney, Agent, or Firm*—David O'Reilly

(57) ABSTRACT

A method of making a chair component by forming a hollow enclosure in a blow mold, cutting an aperture in a recess on one side of the hollow enclosure just big enough to receive a rigid bracket adapter insert, then filling the hollow interior with a resilient foam behind the rigid bracket adapter insert. The hollow enclosure is in the shape of an armrest and has a recess shaped to fit an arm bracket or substrate of a chair. Three apertures are cut in the recess leaving some material to retain structural integrity of the hollow enclosure skin. The rigid bracket adapter insert is installed through one of the apertures and has a rectangular peripheral ridge to fit around the interior wall of the rectangular recess. The hollow enclosure is then backfilled with a foam behind the rigid bracket adapter insert forming an integral resilient low-cost armrest.

9 Claims, 3 Drawing Sheets

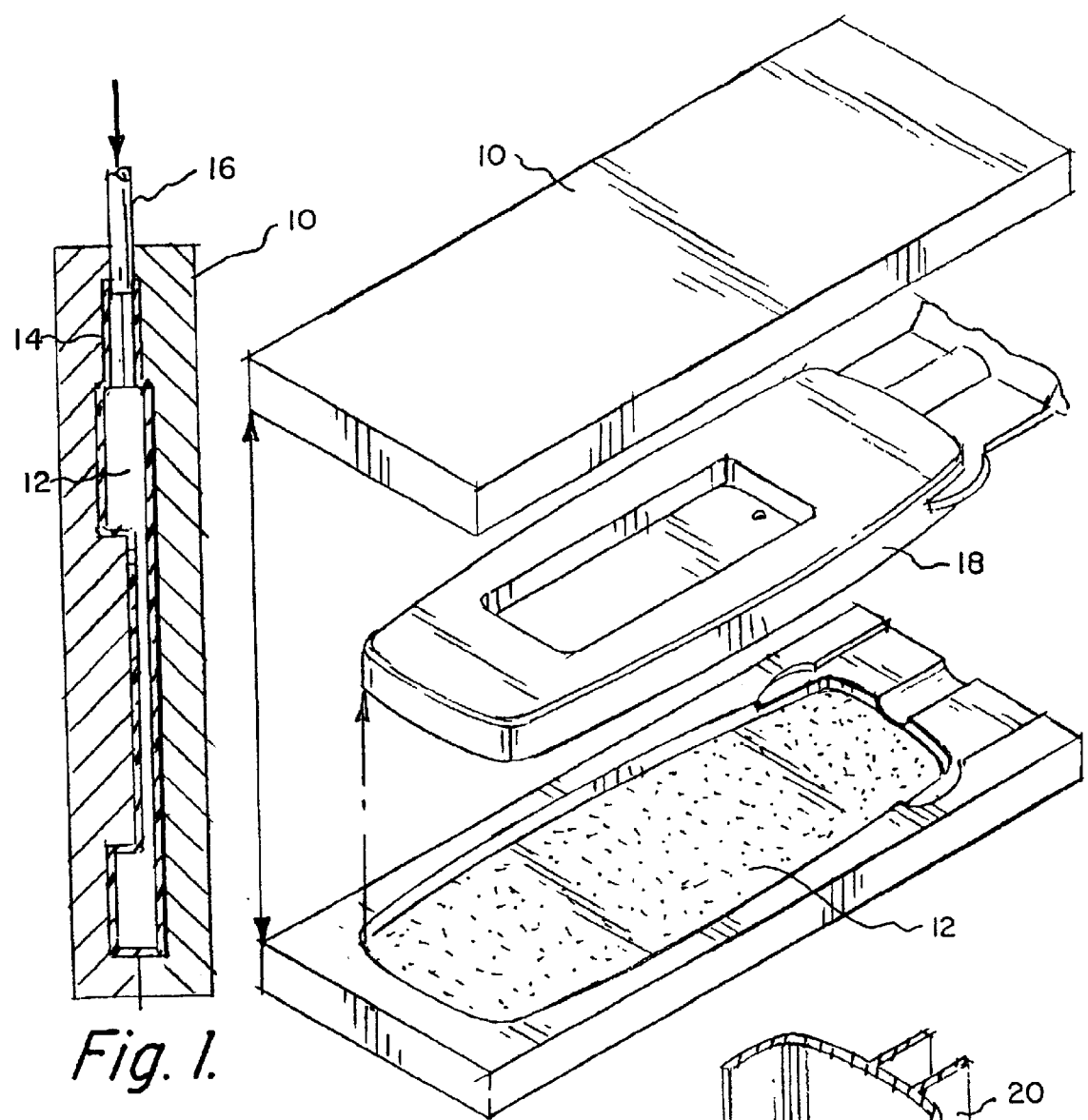

BLOW MOLDED, BACKFILLED PROCESS AND PRODUCT

BACKGROUND OF THE INVENTION

1. Field of the Invention

This invention relates to components for office chairs and more particularly relates to a blow molded, back-filled cushion product and process for making the product.

2. Background Information

Presently office chair components such as armrests are made in three different ways. These methods involve a polyurethane self-skin foam, an injection molded PVC cover assembled with foam, and an injection molded PVC skin filled with foam. These arms are always mounted to a substrate or chair bracket that is mounted to the under side of a seat pan. These standard armrest substrates or mounting brackets are sold in large quantifies to small and mid-size chair manufacturers.

The polyurethane self-skin foam is a very common method because the tooling is not expensive, and the part can be made on a wide variety of substrates. This allows companies to make standard armrest shapes that can be sold as open, off-the-self items to a wide variety of customers. Since the tooling investment is low, some small and mid-market chair manufacturers design and tool their own self-skin part. The disadvantage of self-skin parts is that by nature they are very hard, and difficult to make in colors.

It is generally agreed in the marketplace that a PVC skin and foam combination is more desirable due to the durability of the skin, and the ability to use a soft foam behind it. On average, a PVC skin can be up to 30% softer than a self-skin armrest.

Injection molded product skins need to have a large enough opening to extract it from the tool. The large opening at the bottom of the part due to the product skin shape must be covered in a way that traps the skin so it cannot be pulled off a chair arm by an end user when mounted on a chair. Large manufacturers of office chairs with large tooling budgets solve this problem by designing a substructure to trap the skin. Even with this design the skin frequently is damaged by being pulled loose by an end user.

Small and mid-size companies that cannot afford to tool their own substrates, buy standard substrates. A mating piece and staples are needed to trap and secure the skin so that it cannot be pulled off and to act as an interface between the arm and the substrate. The expense to create both a tool for a PVC skin and mating piece, along with the costs of the part make it extremely prohibitive for a small to mid-market chair manufacturer to use PVC. In fact, there does not appear to be any standard off-the-shelf PVC skin armrest existing in the marketplace today.

It is therefore one object of the present invention to provide a way to make a PVC and resilient foam armrest without a large opening eliminating the need for a mating piece, yet retaining all the benefits of a PVC and foam chair component or armrest.

Another object of the present invention is to provide a method for making a skin for a chair component such as an armrest that is initially a completely sealed enclosure.

Still another object of the present invention is to create a skin to make an armrest using a blow molding process that allows this manufacturer of a skin that is completely enclosed and as a result cannot be pulled off by the end user and needs no mating piece.

Still another object of the present invention is to provide a method for manufacturing a skin to produce an armrest that can be mounted to virtually any standard armrest bracket or substrate.

Still another object of the present invention is to provide a method for making a skin to produce an armrest that can reduce the cost to tool the skin by as much as 85% over an injected molded PVC skin reducing capitol outlay that is much more acceptable to small and mid-market companies.

BRIEF DESCRIPTION OF THE INVENTION

The purpose of the present invention is to provide a process for making a cushioned product for chairs such as armrests at substantially reduced cost and with an improved cushioned construction.

It was discovered that an improved product at substantially reduced cost can be manufactured by using a blow molded, backfilled cushioned process. Blow molding is a primary method to form hollow plastic objects such as containers. The process includes clamping the ends of a softened tube polymers which can either be extruded or reheated, inflating a polymer against molded walls, and cooling the product before removing it from the mold.

The manufacture of the present cushioned product involves using a PVC material with ultraviolet (UV) inhibitors, fire retardant and a soft durometer formulation that is loaded into a blow molding machine. The polyvinyl chloride (PVC) material is heated sufficiently to melt the product. The machine gravity feeds an extruded cylinder of material called a preform. The thickness of the walls of the extrusion is regulated by the machine. For the purposes of an armrest, a wall thickness of approximately nine one-hundredths of an inch (0.090") is desired.

The tool has the shape of an armrest and is clamped around extruded PVC material and air is blown into the cylinder by the machine. The process of blowing air while clamping the tool around the cylinder makes the PVC material take the shape of the armrest formed by the mold cavity. The force and direction of the air is determined by the shape of the skin. This produces a sealed hollow enclosure in the shape of the armrest with a recess about one-half to two-thirds the surface area along one side. The part is then extracted from the tool and excess material is trimmed or by any suitable arrangement with a sharp knife.

The tools used to make the skin by blow molded process are machined preferably out of steel or aluminum. The interior surface or cavity in the tool is then etched with the texture of the finished part desired. Small vent holes are usually drilled into specific locations in the tool. Air is drawn through these holes at the same time air is blown into the tool resulting in a "vacuum" that helps press the skin firmly against the walls of the tool.

Since the skin and the backfilling foam for the armrest do not provide any substantial structural integrity, a rigid insert or arm bracket adapter is used. The rigid insert is installed in the hollow enclosure in the shape of the armrest through holes cut in the recess formed in the enclosure. Preferably the insert or adapter can be of any suitable rigid material such as wood, steel, aluminum but is preferably of a synthetic plastic. The insert provides a bracket adapter having a rigid structure used to attach the armrest to the chair bracket and gives structural integrity to the product. The hole cut in the recess on the underside of the hollow enclosure forming the skin is just large enough to squeeze the rigid insert inside the skin.

The part is finished by using an epoxy tool constructed to mirror the outside shape of the hollow enclosure forming the skin for the armrest. The rigid insert or adapter is attached to one half of the epoxy tool via a press fit or by a screw threads. The epoxy tool mold is then closed trapping the hollow enclosure forming the skin and the insert in the tool which insures that foam stays inside the PVC skin.

Foam is then injected through an aperture in the insert behind the insert into the hollow skin which expands as it takes the shape of the skin and the tool. Preferably the foam is a type that provides a suitably resilient armrest. The hollow enclosure forming the skin is filled with the foam which acts to press the rigid insert against the recess in the enclosure providing a sealed product. The rigid insert also has a peripheral ridge or shoulder that mates with a peripheral wall of the recess providing a secure fit between the PVC skin and the rigid insert.

The rigid bracket adapter is also provided with threaded holes for attaching the product to chair brackets or substrates. When an armrest is formed in this manner, the rigid insert provides two mounting holes for mounting the armrest on a chair bracket. Also preferably, the apertures cut out of the recess in the hollow enclosure forming the skin are three separate apertures leaving two webs of material to improve the integrity of the skin.

The above and other objects, advantages, and novel features of the invention will be more fully understood from the following detailed description and the accompanying drawings, in which:

BRIEF DESCRIPTION OF THE DRAWINGS

FIG. 1 is a sectional view of a hollow enclosure forming a skin for the product by a blow molding process.

FIG. 2 illustrates extracting the sealed enclosure from the mold.

FIGS. 3 and 4 illustrate the removal of excess material from the sealed hollow enclosure forming the skin for the product.

DETAILED DESCRIPTION OF THE INVENTION

Figure 4:
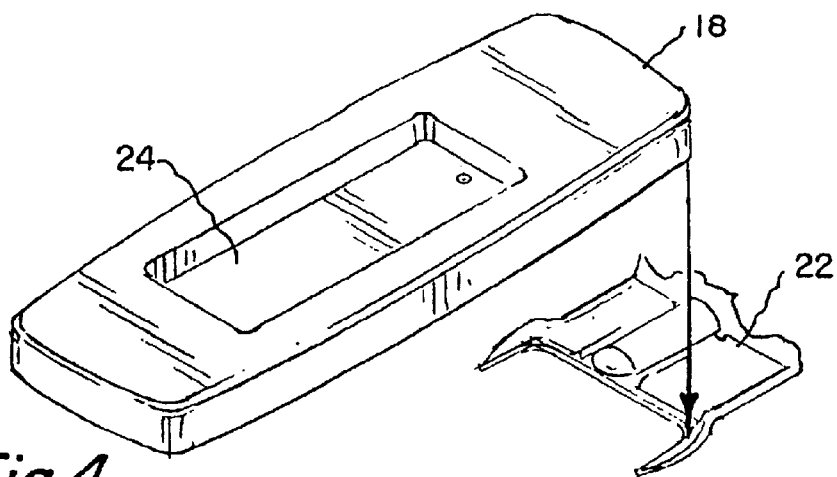
Figure 5:
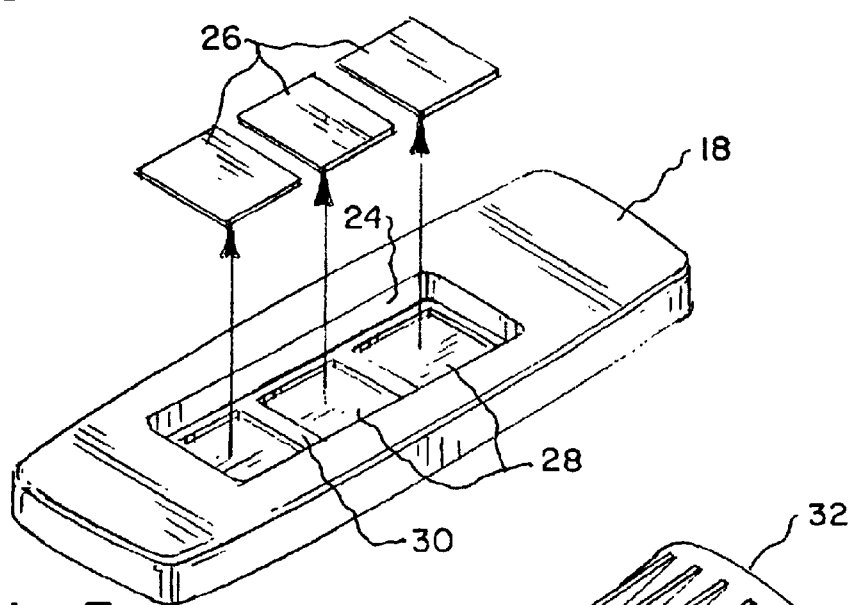
FIG. 5 illustrates the removal of material from a recess in the sealed enclosure forming the skin for insertion of a rigid mounting plate.
Figure 6:
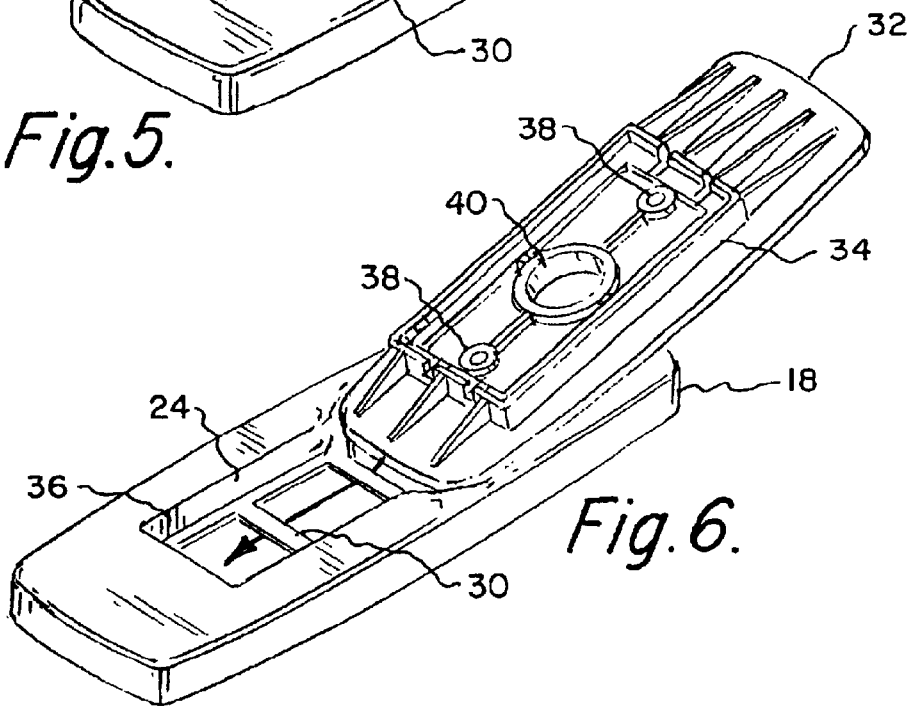
FIG. 6 illustrates the insertion of the rigid mounting plate or bracket adapter into the recess of the hollow enclosure forming the skin.
Figure 7:
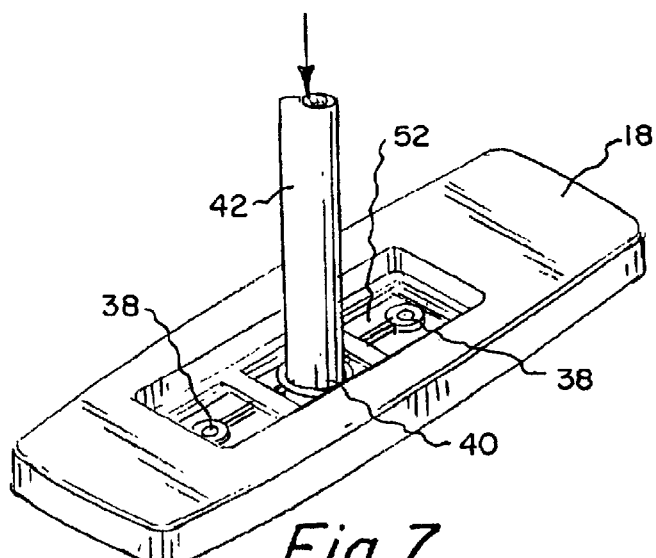
FIG. 7 illustrates the attachment of a tube to the rigid bracket adapter inserted in the hollow enclosure for backfilling with foam.

The invention involves a way to make a PVC chair component backfilled with a resilient foam by a process that provides an improved product and also reduces the cost of manufacturing the product. It was discovered this could be accomplished using blow molding as a means to manufacture the skin for a chair component such as an armrest.

FIG. 1 illustrates the method of using the blow molding process to manufacture an armrest skin. Mold 10 has a cavity 12 shaped to form the hollow enclosure or skin of the finished product. A PVC material is heated and gravity fed into cavity 12 of mold 10 providing an extruded cylinder of material. The surface of cavity 10 is etched to the texture of the finished part desired. The thickness of the walls of the extrusion is regulated by the blow molding machine. Mold or tool 10 having the shape of the skin for forming the armrest is clamped around extruded PVC material 14 and the machine blows air through tube 16 causing PVC material 14 to take the shape of cavity 12 forming the armrest skin. The force and direction of air is determined by the shape of the skin forming the hollow enclosure.

Mold 10 is then opened and hollow enclosure forming skin 18 is removed from the tool. Excess material is then trimmed from hollow enclosure 18 by knife 20 leaving a hollow skin having a rectangular recess 24 on one side. Rectangular recess 24 is approximately one-half to two-thirds the surface area of one side. Cavity 12 of mold 10 can be in a variety of shapes and textures for producing a variety of different shape products or armrests.

After excess material 22 is removed from hollow enclosure 18 forming the armrest skin, apertures are cut in recess 24. Preferably three apertures are cut by removing three equal sections of material 26 leaving three separate apertures 28. This allows a narrow web of material 30 to remain in recess 24 to improve the structural integrity. Apertures 28 are provided for installing a rigid bracket adapter into the hollow interior of skin 18.

The tool to make skin 18 is preferably machined out of steel or aluminum. Interior cavity 12 is also preferably etched to provide a texture to the outer surface of skin 18.

Since hollow enclosure or skin 18 does not provide any substantial structural integrity to the armrest, bracket adapter insert 32 made of any suitable rigid material such as wood, steel, aluminum or plastic provided for expanding foam injected in skin 18 as will be described in greater detail hereinafter. Rigid bracket adapter insert 32, preferably of a synthetic material, has a peripheral ridge 34 that matches the shape of wall 36 of rectangular recess 24 to provide a secure fit as well as a good seal when the hollow enclosure or skin 18 is filled with foam.

Apertures 28 are cut in the surface of rectangular recess 24 that are just large enough to squeeze bracket adapter insert 32 inside the hollow enclosure or skin 18. Bracket adapter insert also has threaded holes 38 to provide a means to attach the arm to a chair bracket as well as add structural integrity to the part. A centrally located aperture 40 in insert 32 is provided for backfilling by injecting foam into the hollow interior of skin 18.

An epoxy tool (not shown) is constructed that mirrors the outside shape of armrest skin 18 with one half of the tool providing a means to attach bracket adapter insert 32 to the tool. The tool includes tubular member 42 which may be press fit into aperture 40 in insert 32 or, if desired, could be threaded. Bracket adapter insert 32 after insertion inside hollow enclosure 18 has peripheral ridge 34 which seats around side wall 36 of rectangular recess 34. Tube 42 provides a means for backfilling by injecting foam into the interior of skin 18 after it is placed in an epoxy mold which is closed trapping skin 18 between insert 32 and the wall of the mold.

Foam is then injected through tube 42 behind rigid bracket adapter insert 32 completely filling the interior of hollow enclosure or skin 18. The tool insures that the foam injected through tube 42 stays inside PVC skin 18. The foam is then allowed to cure and tube 42 removed leaving a completed armrest as illustrated in FIGS. 8 and 9.

Figure 8:
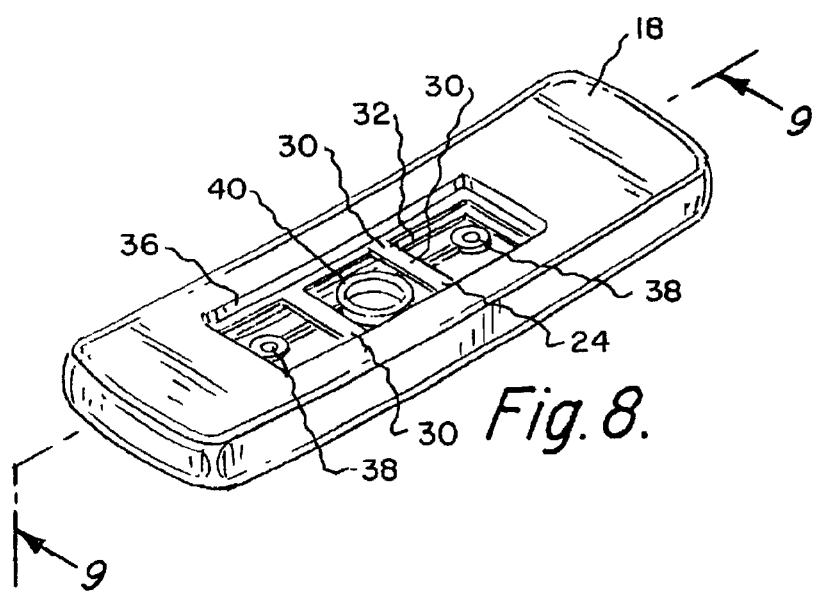
FIG. 8 is an illustration of a product such as a chair armrest formed by the process disclosed and backfilled with resilient foam.
Figure 9:
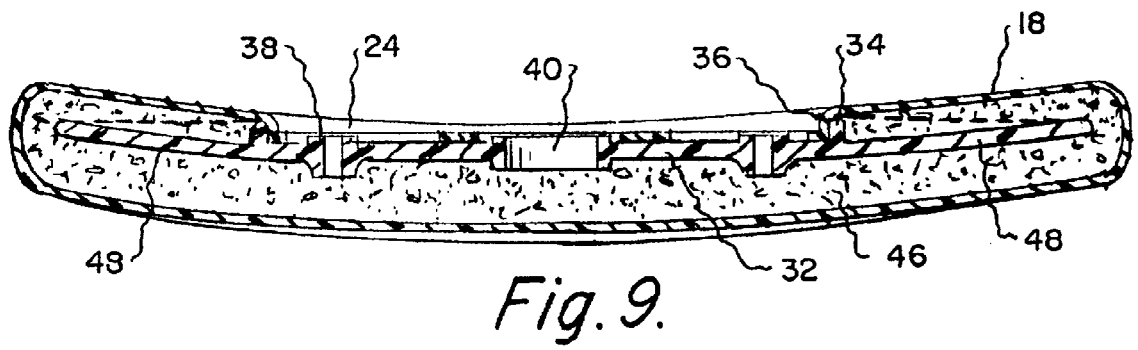
FIG. 9 is a sectional view of the finished product illustrating the backfilling with foam holding the rigid plate securely around the recess in the hollow enclosure forming the skin.

Completed armrest having skin 18 with insert 32 held securely in place inside hollow interior is illustrated in FIGS. 8 and 9. Peripheral ridge 34 engages wall 36 in recess 24. Foam 46 which can be an MDI open cell polyurethane foam fills the interior of skin 18 and securely holds rigid insert 32 in place with peripheral ridge 34 against wall 36 in rectangular recess 24. Foam 46 when injected through tube 42 into the hollow area expands and takes the shape of the skin being held in place by the epoxy tool (not shown). Rigid insert 36 having extensions 48 that nearly extend the complete length of skin 18 provide structural integrity allowing the armrest to be attached to a chair bracket by the threaded holes 38. After foam 46 is sufficiently cured, the completed armrest is removed from the mold.

Thus there has been described a unique method for manufacturing an improved product such as a resilient armrest. The manufacturing method uses a blow molding process to produce a hollow enclosure in the shape of an armrest with a recess along one side to match the shape of an armrest bracket or substrate. Apertures are then cut in the recess just large enough to allow installation of a rigid bracket adapter insert to provide structural integrity and mounting holes for attachment to an arm bracket. The hollow interior is then filled with a resilient, elastomeric foam behind the insert to provide a finished, completed armrest.

Obviously many modifications and variations of the invention are possible in light of the above teachings and it is therefore, to be understood, that the full scope of the invention is not limited to the details disclosed herein, but only by the claims appended hereto, and may be practiced otherwise and as specifically described.

What is claimed is:

1. A method of forming a resilient armrest for chairs comprising;
   forming a substantially hollow rectangular body in a blow mold having an elongate rectangular recess in one side;
   cutting a plurality of apertures in said elongate recess;
   inserting a mounting bracket adapter through said plurality of apertures in said elongate recess into said hollow body;
   backfilling said hollow body behind said mounting bracket adapter with a resilient foam;
   whereby a resilient armrest for attachment to an arm mounting bracket of a chair is formed.

2. The armrest according to claim 1 in which said rectangular recess is approximately in the range of one-half to two-thirds of the area of one side of said hollow body.

3. The armrest according to claim 1 in which said plurality of apertures is a plurality of equally spaced apertures in said recess.

4. The armrest according to claim 1 in which said plurality of apertures in said hollow body is three approximately equal spaced apart square apertures.

5. The armrest according to claim 4 in which said apertures are just large enough to allow said mounting bracket adapter to fit into the interior of said hollow rectangular body.

6. The armrest according to claim 5 in which said mounting bracket adapter is formed with a rectangular peripheral ridge; said rectangular peripheral ridge formed to fit around arm interior sidewalls of said rectangular recess in said hollow body.

7. The armrest according to claim 6 in which said mounting bracket adapter is formed with a central aperture for injecting a resilient foam into the hollow interior of said hollow rectangular body behind said mounting bracket adapter.

8. A method of forming a chair component comprising;
   forming a hollow sealed enclosure in the shape of a chair component;
   trimming excess material from said hollow sealed enclosure;
   forming a rectangular recess on one side of said hollow sealed enclosure;
   emitting a purality of apertures in said recess on one side of said chair shaped component;
   inserting a rigid plate through said plurality of apertures into the interior of said hollow sealed enclosure;
   injecting a synthetic foam material behind said rigid plate to fill said hollow sealed enclosure;
   whereby said rigid plate is firmly held against said opening in said recess thereby forming a chair component.

9. The method according to claim 8 in which said polarity of apertures comprises cutting three apertures in said recess leaving a web of material across said recess to retain structural integrity.

* * * * *